(12) United States Patent
Aiello

(10) Patent No.: US 9,642,350 B2
(45) Date of Patent: May 9, 2017

(54) ICE FISHING ASSEMBLY

(71) Applicant: Pasquale Aiello, Scarborough (CA)

(72) Inventor: Pasquale Aiello, Scarborough (CA)

( * ) Notice: Subject to any disclaimer, the term of this patent is extended or adjusted under 35 U.S.C. 154(b) by 367 days.

(21) Appl. No.: 14/532,505

(22) Filed: Nov. 4, 2014

(65) Prior Publication Data
US 2016/0120161 A1    May 5, 2016

(51) Int. Cl.
A01K 97/01    (2006.01)
A01K 97/12    (2006.01)
A01K 97/11    (2006.01)
A01K 99/00    (2006.01)

(52) U.S. Cl.
CPC ............ A01K 97/01 (2013.01); A01K 97/11 (2013.01); A01K 97/12 (2013.01); A01K 99/00 (2013.01)

(58) Field of Classification Search
CPC ......... A01K 97/01; A01K 97/11; A01K 97/12
See application file for complete search history.

(56) References Cited

U.S. PATENT DOCUMENTS

| | | | |
|---|---|---|---|
| 2,795,072 A * | 6/1957 | Porter | A01K 97/11 43/16 |
| 3,171,227 A * | 3/1965 | Merrill | A01K 89/08 43/20 |
| 3,190,026 A * | 6/1965 | Roszak | A01K 97/12 43/17 |
| 3,407,528 A * | 10/1968 | Lenning | A01K 97/01 43/17 |
| 4,321,767 A | 3/1982 | Hodshire | |
| 4,373,287 A * | 2/1983 | Grahl | A01K 97/01 43/17 |
| 4,416,079 A | 11/1983 | Hodshire | |
| 4,565,025 A * | 1/1986 | Behrle | A01K 97/10 248/538 |
| 4,704,816 A * | 11/1987 | Kuchar | A01K 97/01 43/17 |
| 4,941,278 A * | 7/1990 | Verkuil | A01K 97/11 43/15 |
| 5,050,333 A | 9/1991 | Debreczeni | |
| 5,249,387 A | 10/1993 | Slocum et al. | |
| D432,620 S | 10/2000 | Rozkowski | |
| 6,185,855 B1 * | 2/2001 | Sizer | A01K 97/01 43/21.2 |
| 6,898,892 B2 | 5/2005 | Senckowski | |
| 8,099,898 B2 | 1/2012 | Dungan | |
| 2009/0094878 A1* | 4/2009 | Dungan | A01K 91/065 43/15 |
| 2012/0291332 A1* | 11/2012 | Nolf | A01K 97/01 43/17 |
| 2014/0068995 A1* | 3/2014 | Galbraith | A01K 97/01 43/17 |
| 2014/0352195 A1* | 12/2014 | Peterson | A01K 97/11 43/15 |

* cited by examiner

Primary Examiner — Gary Hoge

(57) ABSTRACT

An ice fishing assembly for urging a fishing line upwardly and downwardly includes a fishing rod. A box is provided. The box may be positioned on a support surface. A bracket is movably coupled to the box. A shaft is coupled to the bracket. The shaft is supported above the box. A plank is coupled to the shaft. The plank is supported above the box. The shaft acts as a fulcrum on the plank. A rod holder is coupled to the shaft. The rod holder engages the fishing rod. The plank engages a line on the fishing rod. The line is urged upwardly and downwardly by the plank.

16 Claims, 5 Drawing Sheets

ICE FISHING ASSEMBLY

BACKGROUND OF THE DISCLOSURE

Field of the Disclosure

The disclosure relates to fishing devices and more particularly pertains to a new fishing device for urging a fishing line upwardly and downwardly.

SUMMARY OF THE DISCLOSURE

An embodiment of the disclosure meets the needs presented above by generally comprising a fishing rod. A box is provided. The box may be positioned on a support surface. A bracket is movably coupled to the box. A shaft is coupled to the bracket. The shaft is supported above the box. A plank is coupled to the shaft. The plank is supported above the box. The shaft acts as a fulcrum on the plank. A rod holder is coupled to the shaft. The rod holder engages the fishing rod. The plank engages a line on the fishing rod. The line is urged upwardly and downwardly by the plank.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
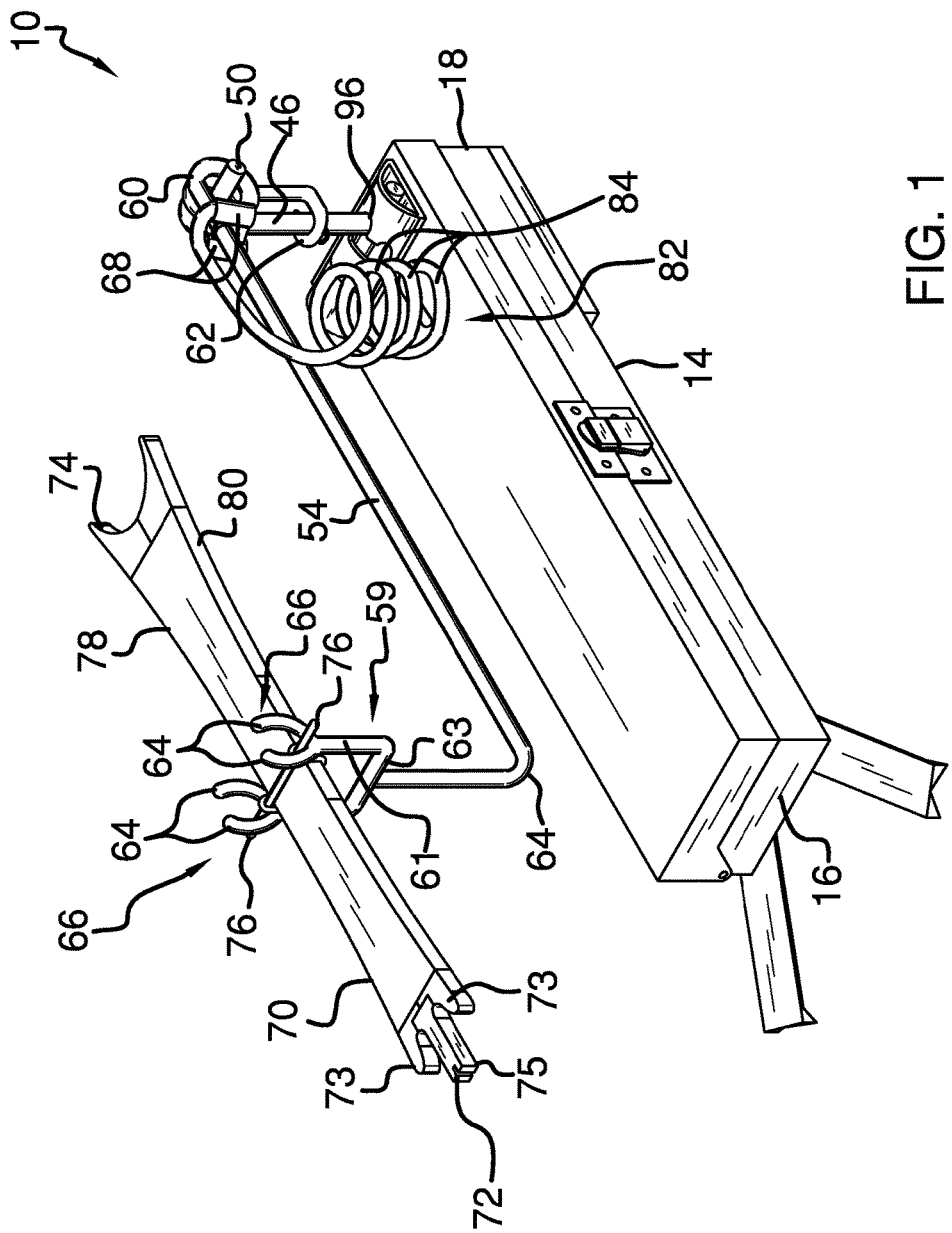
FIG. 1 is a perspective view of an ice fishing assembly according to an embodiment of the disclosure.
Figure 2:
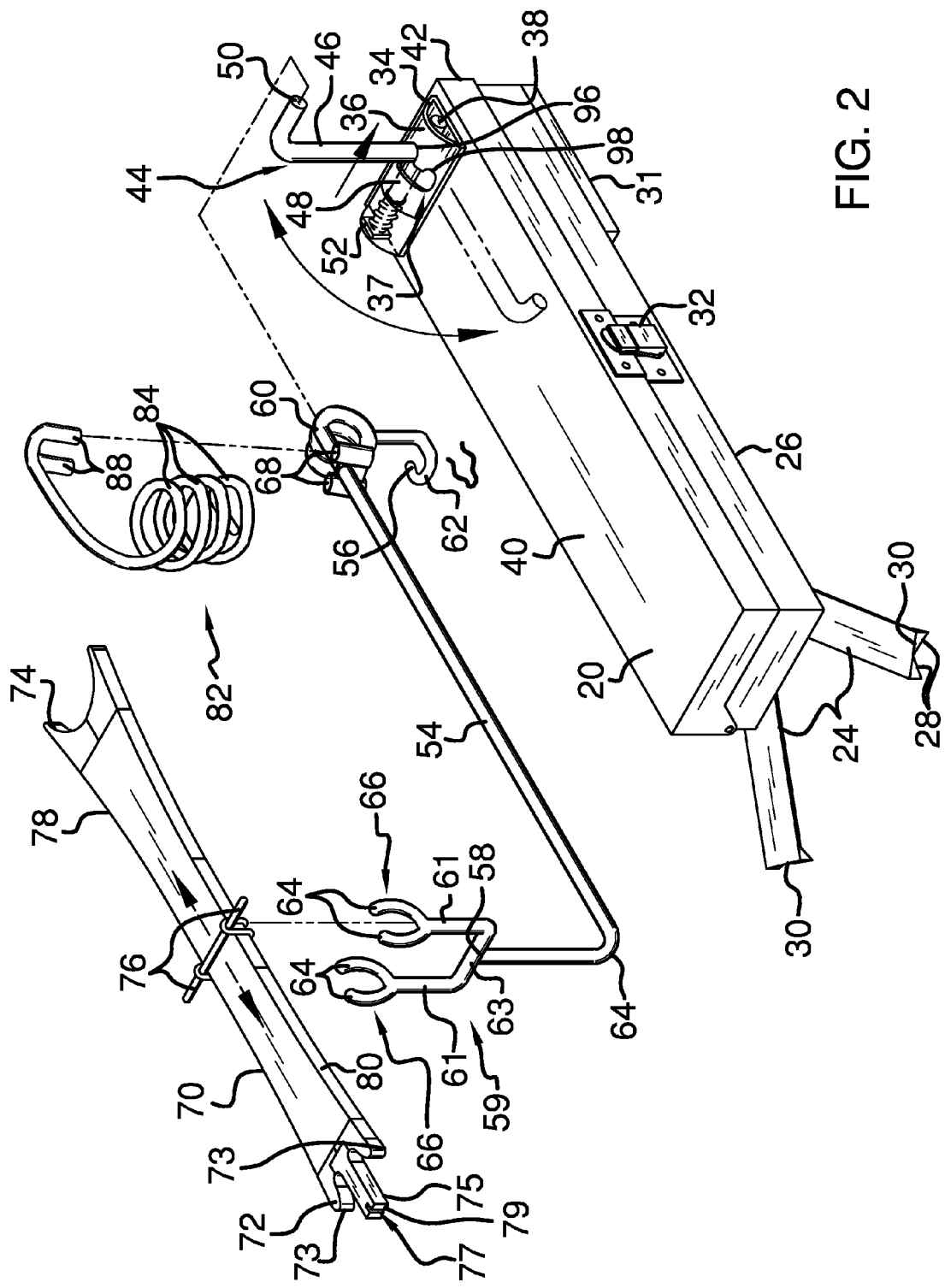
FIG. 2 is an exploded perspective view of an embodiment of the disclosure.
Figure 3:
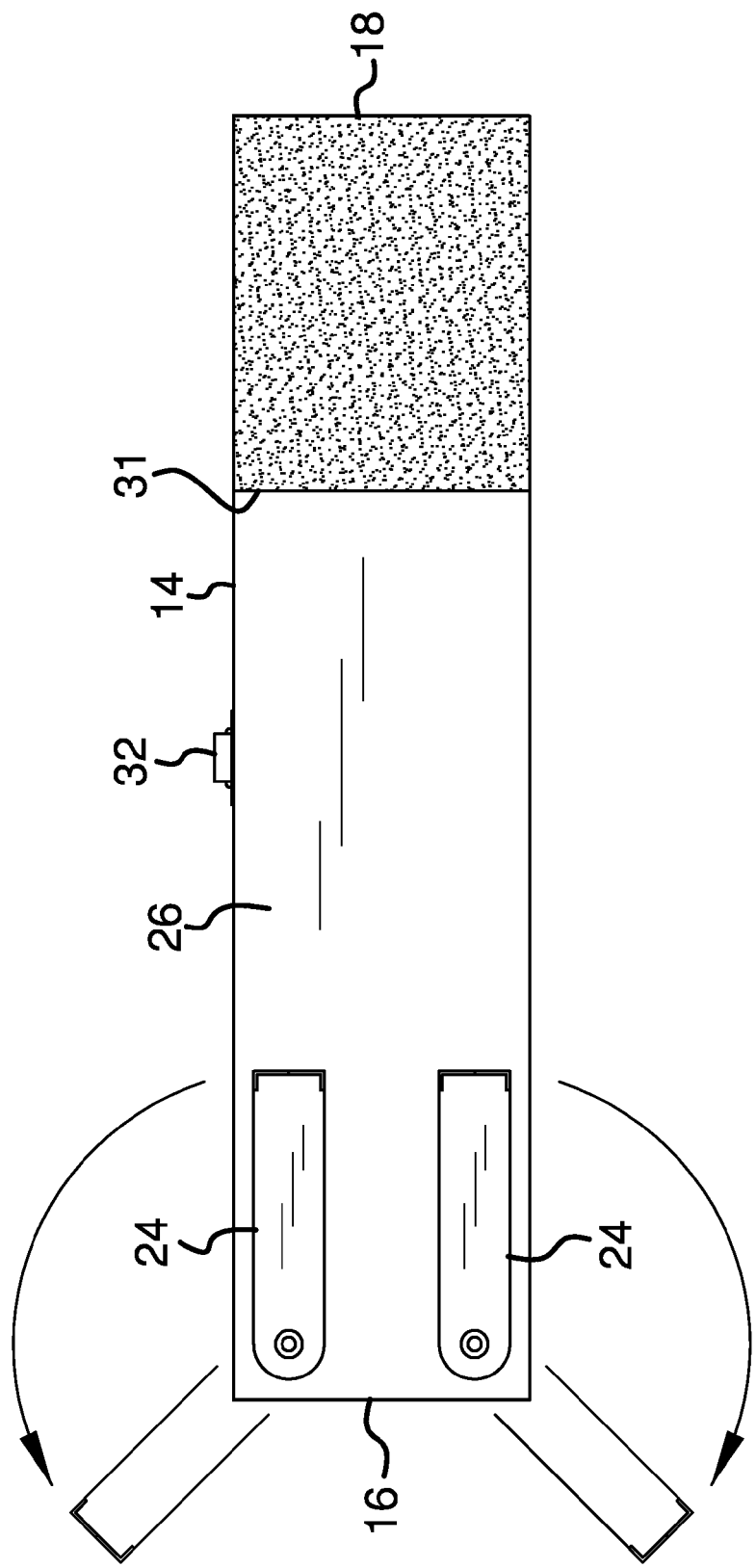
FIG. 3 is a bottom view of an embodiment of the disclosure.
Figure 4:
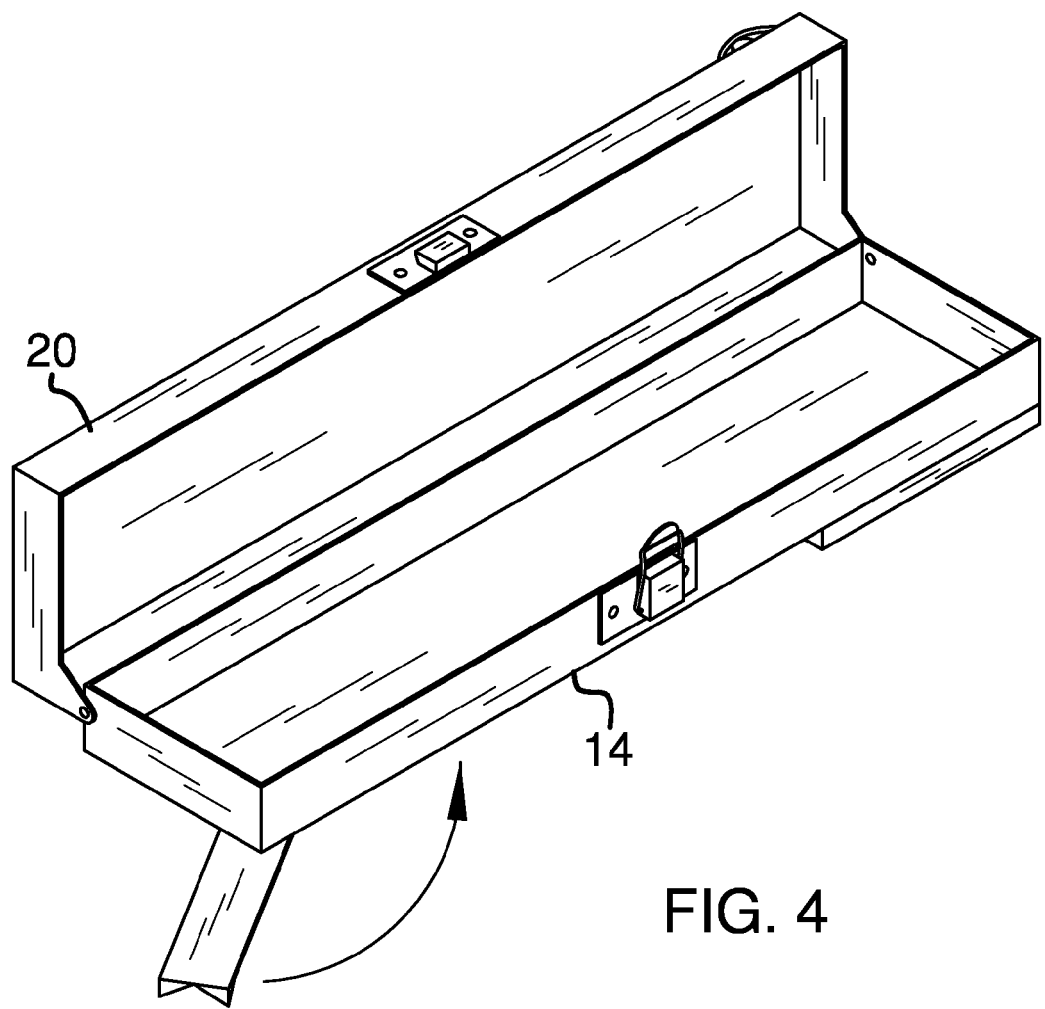
FIG. 4 is a top perspective view of an embodiment of the disclosure.
Figure 5:
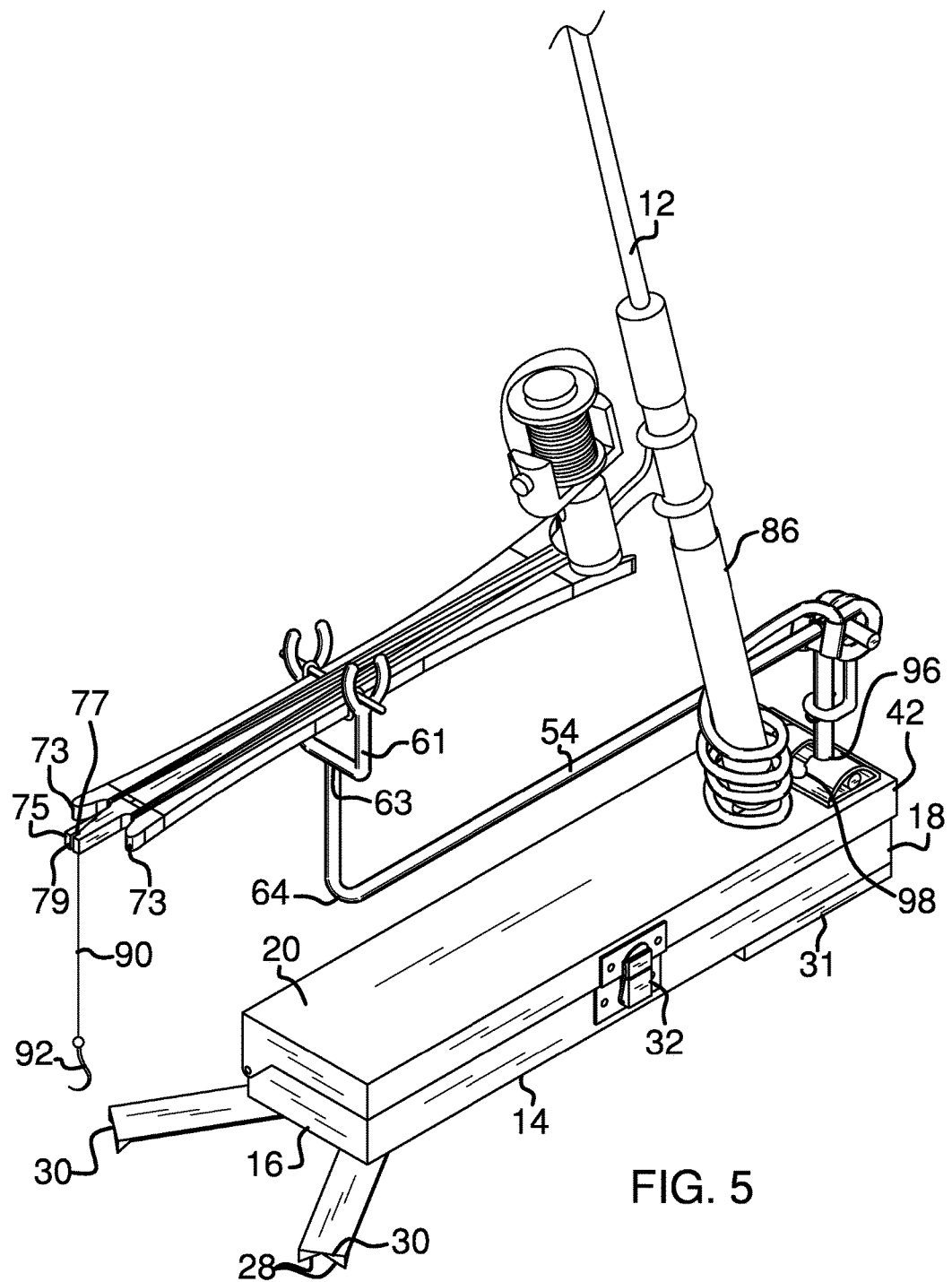
FIG. 5 is an in-use view of an embodiment of the disclosure.

With reference now to the drawings, and in particular to FIGS. 1 through 5 thereof, a new fishing device embodying the principles and concepts of an embodiment of the disclosure and generally designated by the reference numeral 10 will be described.

As best illustrated in FIGS. 1 through 5, the ice fishing assembly 10 generally comprises a fishing rod 12. The fishing rod 12 may be an ice fishing rod of any conventional design. A box 14 is provided. The box 14 is elongated between a first end 16 and a second end 18 of the box 14. The box 14 has a lid 20 hingedly coupled to the box 14 to close the box 14. Moreover, the box 14 may be positioned on a support surface 22. The support surface 22 may be ice on a body of water.

A pair of legs 24 is each hingedly coupled to a bottom side 26 of the box 14. The legs 24 are each positioned proximate the first end 16 of the box 14. A set of claws 28 is coupled to and extends downwardly from an uncoupled end 30 of each of the legs 24. The claws 28 engage the support surface 22 to retain the box 14 on the support surface 22.

A pad 31 is coupled to the bottom side 26 of the box 14. The pad 31 is positioned proximate the second end 18 of the box 14. The pad 31 abuts the support surface 22. A lock 32 is coupled to the lid 20. The lock 32 engages the box 14 the when the lid 20 is closed. The lock 32 retains the lid 20 in the closed position.

A shell 34 is provided. The shell 34 has a top wall 36 coupled to a bottom wall 38 of the shell 34. The top wall 36 of the shell 34 is curved so the shell 34 has a quonset shape. The bottom wall 38 of the shell 34 is coupled to a top side 40 of the lid 20. Additionally, the shell 34 is positioned adjacent to a back side 42 of the lid 20. The top wall 36 of the shell 34 has a slot 37 extending therethrough. The slot 37 has a T-shape.

A bracket 44 is provided. The bracket 44 has a vertical arm 46 coupled to and extending away from a horizontal arm 48 of the bracket 44. The horizontal arm 48 of the bracket 44 is hingedly coupled the bottom wall 38 of the shell 34. The vertical arm 46 of the bracket 44 extends upwardly through the slot 37 in the top wall 36 of the shell 34. A free end 50 of the vertical arm 46 of the bracket 44 is bent so the vertical arm 46 of the bracket 44 has a J-shape.

A spring biasing member 52 is coupled to the horizontal arm 48 of the bracket 44. The spring biasing member 52 biases the bracket 44 into a first notch 96 in the slot 37 to define a deployed position having the vertical arm 46 of the bracket 44 extending upwardly from the top wall 36 of the shell 34. The bracket 44 is positionable in a second notch 98 in the slot 37 defining a stored position having the vertical arm 46 of the bracket 44 abutting the top side 40 of the lid 20.

A shaft 54 is provided. The shaft 54 has a primary end 56 and a secondary end 58. The shaft 54 is bent into a plurality of coils 60 proximate the secondary end 58 of the shaft 54. The free end 50 of vertical arm 46 of the bracket vertical arm 46 is insertable through the coils 60 so the shaft 54 is spaced upwardly from and extends forwardly along the top side 40 of the lid 20. The secondary end 58 of the shaft is further bent into a hook 62. The hook 62 engages the vertical arm 46 of the bracket 44 when the free end 50 of the vertical arm 46 of the bracket 44 is inserted through the plurality of coils 60. The shaft 54 is retained to lie on a plane that is planar with the top side 40 of the lid 20.

The shaft 54 has a first bend 65 positioned proximate the primary end 56 of the shaft 54. The primary end 56 of the shaft 54 is directed upwardly from the shaft 54. A mount 59 is provided. The mount 59 has a pair of upward arms 61 each coupled to and extending upwardly from a lateral arm 63 of the mount 59.

An end 64 of each of the upward arms 61 of the mount 59 splits into a U-shape to define a pair of retainers 66. The lateral arm 63 of the mount 59 is coupled to the primary end 56 of the shaft 54. Each of a pair of sleeves 68 are coupled to the shaft 54. The sleeve 68 are positioned proximate the plurality of coils 60. Additionally, each of the sleeves 68 are positioned on opposite sides of the shaft 54.

A plank 70 is provided. The plank 70 is elongated between a forward end 72 of the plank 70 and a rearward end 74 of the plank 70. The forward end 72 has a pair of lateral lobes 73 and a central lobe 75. Each of the lateral lobes 73 and the central lobe 75 extend forwardly from the forward end 72 to define a crown shape. The central lobe 75 has a length that is greater than the lateral lobes 73. Additionally, the central lobe 75 has a line groove 77 extending into a frontmost edge 79 of the central lobe 75. The rearward end 74 is cupped toward the forward end 72.

A pair of pegs 76 is each coupled to and extends laterally away from an associated one of a first oblique side 78 and a second oblique side 80 of the plank 70. Each of the pegs 76 is positioned within the pair of retainers 66. The plank 70 is tiltably coupled to and spaced upwardly from the shaft 54. Moreover, the retainers 66 act as a fulcrum on the plank 70.

A rod holder 82 is provided. The rod holder 82 is bent into a plurality of coils 84. The plurality of coils 84 is structured to insertably receive a handle 86 of the fishing rod 12. A coupling end 88 of the rod holder 82 extends away from the plurality of coils 84. The coupling end 88 splits into a pair of coupling ends 88. Each of the coupling ends 88 of the rod holder 82 is insertable into an associated one of the sleeves 68 so the rod holder 82 is coupled to the shaft 54.

The fishing rod 12 extends upwardly from the rod holder 82. Additionally, the fishing rod 12 angles toward the forward end 72 of the plank 70. A line 90 from the fishing rod 12 is wrapped around the plank 70 such that the line 90 extends between the forward end 72 and the rearward end 74. The line 90 is positioned between the central lobe 75 and each of the lateral lobes 73. The line 90 is further positioned within the line groove 77 such that a hook 92 on the line 90 is positioned a desired distance below the plank 70.

In use, the assembly 10 is utilized in the convention of ice fishing. The plank 70 tilts on the shaft 54 when a fish bites the hook 90. The plank 70 provides an increased degree of sensitivity to a motion of the line 90 compared to the sensitivity of the fishing rod 12 alone. The shaft 54, rod holder 82 and the plank 70 are stored within the box 12 when the assembly 10 is not being utilized.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An ice fishing assembly comprising:
a fishing rod;
a box configured to be positioned on a support surface;
a bracket movably coupled to said box;
a shaft coupled to said bracket such that said shaft is supported above said box;
a plank coupled to said shaft such that said plank is supported above said box wherein said shaft acts as a fulcrum on said plank; and
a rod holder coupled to said shaft, said rod holder engaging said fishing rod wherein said plank engages a line on said fishing rod such that said line is urged upwardly and downwardly by said plank.

2. The assembly according to claim 1, further comprising said box being elongated between a first end and a second end of said box, said box having a lid hingedly coupled to said box to close said box.

3. The assembly according to claim 2, further comprising said bracket having a vertical arm coupled to and extending away from a horizontal arm of said bracket, said horizontal arm of said bracket being hingedly coupled a top side of said lid such that said horizontal arm of said bracket is positioned adjacent to a back side of said lid.

4. The assembly according to claim 3, further comprising a free end of said vertical arm of said bracket being bent such that said vertical arm of said bracket has a J-shape.

5. The assembly according to claim 4, further comprising said shaft having a primary end and a secondary end, said shaft being bent into a plurality of coils proximate said secondary end of said shaft wherein said free end of said bracket is insertable through said coils such that said shaft is spaced upwardly from and extends forwardly along said top side of said lid.

6. The assembly according to claim 5, further comprising said secondary end of said shaft being further bent into a hook, said hook engaging said vertical arm of said bracket when said free end of said bracket is inserted through said plurality of coils such that said shaft lies on a plane being planar with said top side of said lid.

7. The assembly according to claim 1, further comprising said shaft having a first bend positioned proximate a primary end of said shaft such that said primary end of said shaft is directed upwardly from said shaft.

8. The assembly according to claim 1, further comprising a mount, said mount having a pair of upward arms each coupled to and extending upwardly from a lateral arm of said mount.

9. The assembly according to claim 8, further comprising an end of each of said upward arms of said mount splitting into a U-shape to define a pair of retainers.

10. The assembly according to claim 9, further comprising said lateral arm of said mount being coupled to a primary end of said shaft.

11. The assembly according to claim 1, further comprising a pair of pegs each coupled to an extending laterally away from an associated one of a first oblique side and a second oblique side of said plank.

12. The assembly according to claim 11, further comprising each of said pegs being positioned within a pair of retainers such that said plank tiltably coupled to and spaced upwardly from said shaft.

13. The assembly according to claim 1, further comprising said rod holder being bent into a plurality of coils such that said plurality of coils is structured to insertably receive a handle of said fishing rod.

14. The assembly according to claim 13, further comprising a coupling end of said rod holder extending away from said plurality of coils, said coupling end of said rod holder engaging said shaft such that said rod holder is coupled to said shaft.

15. The assembly according to claim 14, further comprising said fishing rod extending upwardly from said rod holder such that said fishing rod angles toward a forward end of said plank, said forward end of said plank engaging said line on said fishing rod.

16. An ice fishing assembly comprising:
- a fishing rod;
- a box, said box being elongated between a first end and a second end of said box, said box having a lid hingedly coupled to said box to close said box, said box being configured to be positioned on a support surface;
- a bracket, said bracket having a vertical arm coupled to and extending away from a horizontal arm of said bracket, said horizontal arm of said bracket being hingedly coupled a top side of said lid such that said horizontal arm of said bracket is positioned adjacent to a back side of said lid; a free end of said vertical arm of said bracket being bent such that said vertical arm of said bracket has a J-shape;
- a shaft having a primary end and a secondary end, said shaft being bent into a plurality of coils proximate said secondary end of said shaft wherein said free end of said bracket is insertable through said coils such that said shaft is spaced upwardly from and extends forwardly along said top side of said lid, said secondary end of said shaft being further bent into a hook, said hook engaging said vertical arm of said bracket when said free end of said bracket is inserted through said plurality of coils such that said shaft lies on a plane being planar with said top side of said lid;
- said shaft having a first bend positioned proximate said primary end of said shaft such that said primary end of said shaft is directed upwardly from said shaft;
- a mount, said mount having a pair of upward arms each coupled to and extending upwardly from a lateral arm of said mount, an end of each of said upward arms of said mount splitting into a U-shape to define a pair of retainers, said lateral arm of said mount being coupled to said primary end of said shaft;
- a plank;
- a pair of pegs each coupled to an extending laterally away from an associated one of a first oblique side and a second oblique side of said plank, each of said pegs being positioned within said pair of retainers such that said plank is tiltably coupled to and spaced upwardly from said shaft wherein said retainers act as a fulcrum on said plank; and
- a rod holder, said rod holder being bent into a plurality of coils such that said plurality of coils is structured to insertably receive a handle of said fishing rod, a coupling end of said rod holder extending away from said plurality of coils, said coupling end of said rod holder engaging said shaft such that said rod holder is coupled to said shaft; and
- said fishing rod extending upwardly from said rod holder such that said fishing rod angles toward a forward end of said plank, said forward end of said plank engaging said line on said fishing rod such that said line is urged upwardly and downwardly by said plank.

* * * * *